US011451790B2

(12) United States Patent
Liu et al.

(10) Patent No.: US 11,451,790 B2
(45) Date of Patent: Sep. 20, 2022

(54) METHOD AND APPARATUS IN VIDEO CODING FOR MACHINES

(71) Applicant: TENCENT AMERICA LLC, Palo Alto, CA (US)

(72) Inventors: Shan Liu, San Jose, CA (US); Wen Gao, West Windsor, NJ (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/360,838

(22) Filed: Jun. 28, 2021

(65) Prior Publication Data

US 2022/0116627 A1   Apr. 14, 2022

Related U.S. Application Data

(60) Provisional application No. 63/090,555, filed on Oct. 12, 2020, provisional application No. 63/089,858, filed on Oct. 9, 2020.

(51) Int. Cl.
*H04N 19/154* (2014.01)
*H04N 19/182* (2014.01)
*H04N 19/184* (2014.01)
*H04N 19/147* (2014.01)

(52) U.S. Cl.
CPC ......... *H04N 19/154* (2014.11); *H04N 19/147* (2014.11); *H04N 19/182* (2014.11); *H04N 19/184* (2014.11)

(58) Field of Classification Search
CPC .. H04N 19/154; H04N 19/147; H04N 19/182; H04N 19/184
See application file for complete search history.

(56) References Cited

U.S. PATENT DOCUMENTS

| | | | |
|---|---|---|---|
| 2013/0094564 A1* | 4/2013 | Yang | H04N 19/152 375/E7.126 |
| 2019/0295242 A1 | 9/2019 | Bampis et al. | |
| 2019/0297329 A1* | 9/2019 | Bampis | H04N 21/252 |
| 2019/0379895 A1* | 12/2019 | Katsavounidis | H04N 19/103 |
| 2020/0092556 A1* | 3/2020 | Coelho | H04N 19/147 |

(Continued)

OTHER PUBLICATIONS

International Search Report and Written Opinion Issued in Application PCT/US2021/040058 dated Nov. 3, 2021, (23 pages).

(Continued)

*Primary Examiner* — Tracy Y. Li

(74) *Attorney, Agent, or Firm* — ArentFox Schiff LLP

(57) ABSTRACT

Aspects of the disclosure provide methods and apparatuses for use in video coding for machines. In some examples, an apparatus of video coding for machines includes processing circuitry. The processing circuitry determines a first picture quality vs. coding efficiency characteristic for a first coding scheme of video coding for machines (VCM), and a second picture quality vs. coding efficiency characteristic for a second coding scheme of VCM. Then, the processing circuitry determines a Bjøntegaard delta (BD) metric for a comparison of the first coding scheme and the second coding scheme, based on the first picture quality vs. coding efficiency characteristic and the second picture quality vs. coding efficiency characteristic.

14 Claims, 9 Drawing Sheets

(56) References Cited

U.S. PATENT DOCUMENTS

2021/0103780 A1* 4/2021 Mammou ............ G06K 9/6215

OTHER PUBLICATIONS

Ling-Yu Duan et al., "Video Coding for Machines: A Paradigm of Collaborative Compression and Intelligent Analytics", IEEE Transactions on Image Processing, pp. 8680-8695 [online], https:arxiv.org/pdf/2001.03569.pdf, DOI:10.1109/TIP.2020.3016485, especially FIG. 6, Table III, pp. 2-3, 5, 9, 11-12, vol. 29, Jan. 13, 2020 (15 pages).

Alexandre Mercat et al., "Exploiting Computation Skip to Reduce Energy Consumption by Approximate Computing, an HEVC Encoder Case Study", Design, Automation & Test in Europe Conference & Exhibition, pp. 494-499 [online], https://hal.archives-ouvertes.fr/hal-02136715/document, DOI: 10.239/DATE.2017.79270369, May 15, 2017 (7 pages).

Source: Gisle Bjontegaard, "Calculation of average PSNR differences between RD-curves", ITU—Telecommunications Standardization Sector, Study Group 16 Question 6, Video Coding Experts Group (VCEG), VCEG-M33, 13th Meeting, Austin, Texas, Apr. 2-4, 2001 (4 pages).

"Use cases and requirements for Video Coding for Machines", International Organization For Standardization Organisation Internationale De Normalisation ISO/IEC JTC1/SC29/WG11 Coding of Moving Pictures and Audio, ISO/IEC JTC1/SC29/WG11/w19506, Jun. 2020 Online Meeting, Date of Document Jul. 3, 2020 (20 pages).

"Draft Evaluation Framework for Video Coding for Machines", International Organization for Standardization Organisation Internationale De Normalisation ISO/IEC JTC1/SC29/WG11 Coding of Moving Pictures and Audio, ISO/IEC JTC1/SC29/WG11/w19507, Jun.-Jul. 2020, Online Meeting, Date of Document Jul. 3, 2020 (42 pages).

"Draft Call for Evidence for Video Coding for Machines", International Organization For Standardization Organisation Internationale De Normalisation ISO/IEC JTC1/SC29/WG11 Coding of Moving Pictures and Audio, ISO/IEC JTC1/SC29/WG11 MPEG2018/w19508, Jun.-Jul. 2020, Online Meeting, Date of Document Jul. 3, 2020 (8 pages).

Zhou Wang et al., "Multi-Scale Structural Similarity for Image Quality Assessment", Published in Proceedings of the 37th IEEE Asilomar Conference on Signals, Systems and Computers, Pacific Grove, CA, Nov. 9-12, 2003 (5 pages).

* cited by examiner

400

If $D_h <$ Thresh$_h$ and $D_m <$ Thresh$_m$ $D = (1-w1) \times D_m + w1 \times D_h$ else $D=1$ $C = D + \lambda \times RT$

If $D_h <$ Thresh$_h$ $D = D_m$ else $D = 1$ $C = D + \lambda \times RT$

If $D_h$ < $Thresh_h$ $D = D_m$ else $D = (1-w1) \times D_m + w1 \times D_h$ $C = D + \lambda \times RT$ If $D_0 <$ Thresh$_0$, $D_1 <$ Thresh$_1$, ..., $D_{M-1} <$ Thresh$_{M-1}$ $D = w(0) \times D_0 + w(1) \times D_1 + \cdots + w(M-1) \times D_{M-1}$ else $D = 1$ $C = D + \lambda \times RT$

METHOD AND APPARATUS IN VIDEO CODING FOR MACHINES

INCORPORATION BY REFERENCE

This present disclosure claims the benefit of priority to U.S. Provisional Application No. 63/090,555, "WEIGHTED PERFORMANCE METRIC FOR VIDEO CODING FOR MACHINE" filed on Oct. 12, 2020, and U.S. Provisional Application No. 63/089,858, "PERFORMANCE METRIC FOR VIDEO CODING FOR MACHINE" filed on Oct. 9, 2020. The entire disclosures of the prior applications are hereby incorporated by reference in their entirety.

TECHNICAL FIELD

The present disclosure describes embodiments generally related to video coding for machines.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Traditionally video or images are consumed by human being for variety of usages, such as entertainment, education, etc. Thus, video coding or image coding often utilize characteristics of human visual system for better compression efficiency while maintaining good subjective quality.

In recent years, with the rise of machine learning applications, along with the abundance of sensors, many platforms utilize video for machine vision tasks, such as object detection, segmentation or tracking, and the like. Video or image coding for consumption by machine tasks becomes an interesting and challenging field.

SUMMARY

Aspects of the disclosure provide methods and apparatuses for use in video coding for machines. In some examples, an apparatus of video coding for machines includes processing circuitry. The processing circuitry determines a first picture quality vs. coding efficiency characteristic for a first coding scheme of video coding for machines (VCM), and a second picture quality vs. coding efficiency characteristic for a second coding scheme of VCM. Then, the processing circuitry determines a Bjøntegaard delta (BD) metric for a comparison of the first coding scheme and the second coding scheme, based on the first picture quality vs. coding efficiency characteristic and the second picture quality vs. coding efficiency characteristic.

In some embodiments, the processing circuitry calculates the BD metric in at least one of mean average precision (mAP), bits per pixel (BPP), multiple object tracking accuracy (MOTA), average precision at intersection over union threshold of 50% (AP50), average precision at intersection over union threshold of 75% (AP75) and mean accuracy.

In some examples, the first picture quality vs. coding efficiency characteristic includes a first curve in a two dimensional plane for picture quality and coding efficiency, and the second picture quality vs. coding efficiency characteristic includes a second curve in the two dimensional plane for the picture quality and coding efficiency. In an example, the processing circuitry calculates the BD metric as an average gap between the first curve and the second curve.

In some examples, the first picture quality vs. coding efficiency characteristic includes first multiple picture quality vs. coding efficiency curves for the first coding scheme in a two dimensional plane for picture quality on a first axis and coding efficiency on a second axis, and the second picture quality vs. coding efficiency characteristic includes second multiple picture quality vs. coding efficiency curves for the second coding scheme in the two dimensional plane for the picture quality and coding efficiency. The processing circuitry computes a first pareto front curve of the first multiple picture quality vs. coding efficiency curves for the first coding scheme, and computes a second pareto front curve of the second multiple picture quality vs. coding efficiency curves for the second coding scheme. Then, the processing circuitry calculates the BD metric based on the first pareto front curve and the second pareto front curve.

In an example, the second picture quality vs. coding efficiency characteristic curves respectively correspond to the first picture quality vs. coding efficiency characteristic curves. Then, the processing circuitry calculates BD metric values respectively based on the first picture quality vs. coding efficiency characteristic curves and the corresponding second picture quality vs. coding efficiency characteristic curves. Then, the processing circuitry calculates a weighted sum of the BD metric values as an overall BD metric for the comparison of the first coding scheme and the second coding scheme.

In some examples, the first coding scheme and the second coding scheme are used for video coding for both machine vision and human vision. The processing circuitry calculates a first BD-rate of bits per pixel (BPP) for machine vision, a second BD-rate for human vision and calculates a weighted sum of the first BD-rate and the second BD-rate as an overall BD metric for the comparison of the first coding scheme and the second coding scheme.

In some examples, the first coding scheme and the second coding scheme are used for video coding for both machine vision and human vision. The processing circuitry calculates a first overall distortion based on a weighted sum of distortions for the machine vision and the human vision by the first coding scheme, and calculates a first cost metric value based on the first overall distortion and first rate information of the first coding scheme. Then, the processing circuitry calculates a second overall distortion based on a weighted sum of distortions of the machine vision and the human vision by the second coding scheme and calculates a second cost metric value based on the second overall distortion and second rate information of the second coding scheme. The processing circuitry compares the first coding scheme and the second coding scheme based on the first cost metric value and the second cost metric value.

In some examples, the first coding scheme and the second coding scheme are used for video coding for both machine vision and human vision. The processing circuitry determines the first picture quality based on a weighted sum of distortions for the machine vision and the human vision by the first coding scheme and determines the second picture quality based on a weighted sum of distortions for the machine vision and the human vision by the second coding scheme.

In some examples, the first coding scheme and the second coding scheme are used for video coding for multiple vision tasks. The processing circuitry determines the first picture quality based on a weighted sum of distortions for the multiple vision tasks by the first coding scheme, and determines the second picture quality based on a weighted sum of distortions for the multiple vision tasks by the second coding scheme.

Aspects of the disclosure also provide a non-transitory computer-readable medium storing instructions which when executed by a computer for use in video coding for machines cause the computer to perform the method of video coding.

BRIEF DESCRIPTION OF THE DRAWINGS

Further features, the nature, and various advantages of the disclosed subject matter will be more apparent from the following detailed description and the accompanying drawings in which:

FIGS. 4-7 show examples of pseudo codes according to some embodiments of the disclosure.

DETAILED DESCRIPTION OF EMBODIMENTS

Aspects of the disclosure provide performance metric techniques for video coding for machines (VCM). The performance metric techniques can be used to evaluate performance of a coding tool with respect to another one for meaningful comparison.

Figure 1:
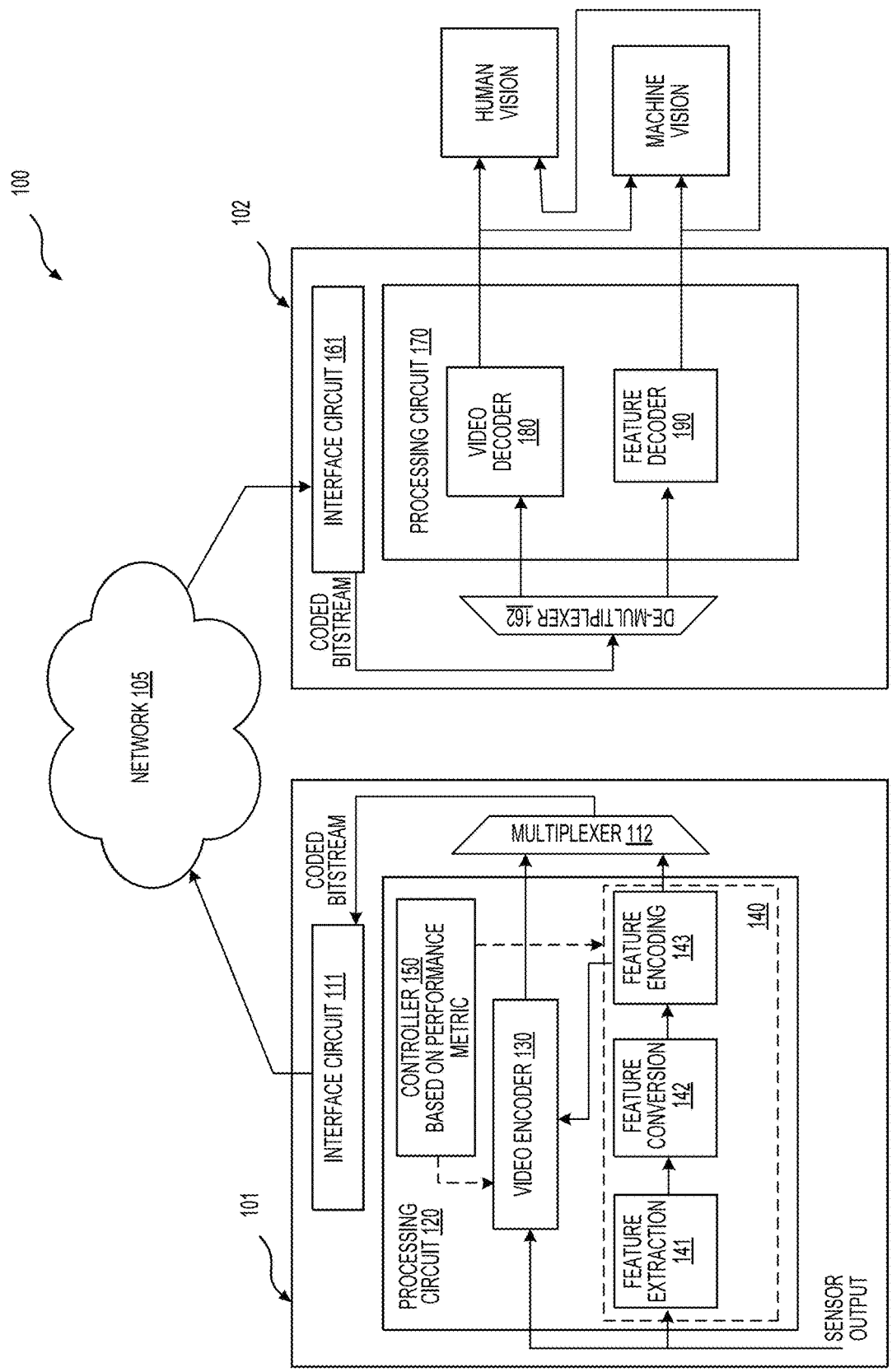
FIG. 1 shows a block diagram of a video coding for machines (VCM) system according to an embodiment of the disclosure.

FIG. 1 shows a block diagram of a VCM system (100) according to an embodiment of the disclosure. The VCM system (100) can be used in various use applications, such as augmented reality (AR) application, autonomous driving application, video game goggles application, sports game animation application, surveillance application, and the like.

The VCM system (100) includes a VCM encoding sub system (101) and a VCM decoding sub system (102) that are connected by a network (105). In an example, the VCM encoding sub system (101) can include one or more devices with video coding for machines functionalities. In an example, the VCM encoding sub system (101) includes a single computing device, such as a desktop computer, a laptop computer, a server computer, a tablet computer and the like. In another example, the VCM encoding sub system (101) includes data center(s), server farm(s), and the like. The VCM encoding sub system (101) can receive video content, such as a sequence of video frames that is output from a sensor device, and compress the video content into a coded bitstream in accordance to video coding for machine vision and/or video coding for human vision. The coded bitstream can be delivered to the VCM decoding sub system (102) via the network (105).

The VCM decoding sub system (102) includes one or more devices with video coding for machines functionalities. In an example, the VCM decoding sub system (102) includes a computing device, such as a desktop computer, a laptop computer, a server computer, a tablet computer, a wearable computing device, a head mounted display (HMD) device, and the like. The VCM decoding sub system (102) can decode the coded bitstream in accordance to video coding for machine vision and/or video coding for human vision. The decoded video contents can be used for machine vision and/or human vison.

The VCM encoding sub system (101) can be implemented using any suitable technology. In the FIG. 1 example, the VCM encoding sub system (101) includes a processing circuit (120), an interface circuit (111) and a multiplexer (112) coupled together.

The processing circuit (120) can include any suitable processing circuitry, such as one or more central processing units (CPUs), one or more graphics processing units (GPUs), application specific integrated circuit, and the like. In the FIG. 1 example, the processing circuit (120) can be configured to include two encoders, such as a video encoder (130) for human vision and a feature encoder (140) for machine vision. In an example, one or more CPUs and/or GPUs can execute software to function as the video encoder (130), and one or more CPUs and/or GPUs can execute software to function as the feature encoder (140). In another example, the video encoder (130) and/or the feature encoder (140) can be implemented using application specific integrated circuits.

In some examples, the video encoder (130) can perform video encoding for human vision on a sequence of video frames and generate a first bitstream, and the feature encoder (140) can perform feature encoding for machine vision on the sequence of video frames and generate a second bitstream. The multiplexer (112) can combine the first bitstream with the second bitstream to generate the coded bitstream.

In some examples, the feature encoder (140) includes a feature extraction module (141), a feature conversion module (142) and a feature encoding module (143). The feature extraction module (141) can detect and extract features from the sequence of video frames. The feature conversion module (142) can convert the extracted features to suitable feature representations, such as feature maps, feature vectors, and the like. The feature encoding module (143) can encode the feature representations into the second bitstream. In some embodiments, the feature extraction can be performed by an artificial neural network.

The interface circuit (111) can interface the VCM encoding sub system (101) with the network (105). The interface circuit (111) can include a receiving portion that receives signals from the network (105) and a transmitting portion that transmits signals to the network (105). For example, the interface circuit (111) can transmit signals that carry the coded bitstream to other devices, such as the VCM decoding sub system (102), via the network (105).

The network (105) is suitably coupled with the VCM encoding sub system (101) and the VCM decoding sub system (102) via wired and/or wireless connections, such as Ethernet connections, fiber-optic connections, WiFi connections, cellular network connections and the like. The network (105) can include network server devices, storage devices, network devices and the like. The components of the network (105) are suitably coupled together via wired and/or wireless connections.

The VCM decoding sub system (102) is configured to decode the coded bitstream for machine vision and/or human vision. In an example, the VCM decoding sub system (102) can perform video decoding to reconstruct a sequence of video frames that can be displayed for human vision. In another example, the VCM decoding sub system (102) can perform feature decoding to reconstruct feature representations that can be used for machine vision.

The VCM decoding sub system (102) can be implemented using any suitable technology. In the FIG. 1 example, the VCM decoding sub system (102) includes an interface circuit (161), a de-multiplexer (162) and a processing circuit 170 coupled together as shown in FIG. 1.

The interface circuit (161) can interface the VCM decoding sub system (102) with the network (105). The interface circuit (161) can include a receiving portion that receives signals from the network (105) and a transmitting portion that transmits signals to the network (105). For example, the interface circuit (161) can receive signals carrying data, such as signals carrying the coded bitstream from the network (105).

The de-multiplexer (162) can separate the received coded bitstream into a first bitstream of coded video and a second bitstream of coded features.

The processing circuit (170) can include suitable processing circuitry, such as CPU, GPU, application specific integrated circuits and the like. The processing circuit (170) can be configured to include various decoders, such video decoder, feature decoder, and the like. For example, the processing circuit (170) is configured to include a video decoder (180) and a feature decoder (190).

In an example, a GPU is configured as the video decoder (180). In another example, a CPU can execute software instructions to function as the video decoder (180). In another example, a GPU is configured as the feature decoder (190). In another example, a CPU can execute software instructions to function as the feature decoder (190).

The video decoder (180) can decode information in the first bitstream of coded video, and reconstruct a decoded video (e.g., a sequence of picture frames). The decoded video can be displayed for human vision. In some examples, the decoded video can be provided for machine vision.

The feature decoder (190) can decode information in the second bitstream of coded features, and reconstruct the features in suitable form of representations. The decoded features can be provided for machine vision. In some examples, the decoded features can be provided for human vision.

Video coding for machines can be performed in the VCM system (100) by various coding tools, or according to various configurations of a coding tool. Aspects of the disclosure provide performance metric techniques to evaluate the performance of the various coding tools and/or various configurations of a coding tool and then can assist a selection of a coding tool and suitable configuration based on the performance metric techniques.

In the FIG. 1 example, the VCM encoding sub system (101) includes a controller (150) coupled to the video encoder (130) and the feature encoder (140). The controller (150) can perform performance evaluation using the performance metric techniques and can select coding tools and/or configurations for use in the video encoder (130) and the feature encoder (140) according to the performance evaluation. The controller (150) can be implemented by various techniques. In an example, the controller (150) is implemented as a processor executing software instructions for performance evaluation, and selection of coding tools and configurations. In another example, the controller (150) is implemented using application specific integrated circuits.

According to some aspects of the disclosure, different picture quality metrics and coding efficiency metrics are used for evaluating video/image coding qualities for human vision and machine vision.

In some examples for evaluation video/image coding qualities for human vision, performance metrics, such as mean squared error (MSE)/peak signal-to-noise ratio (PSNR), structure similarity index measure (SSIM)/multi-scale SSIM (MS-SSIM), video multimethod assessment fusion (VMAF), and the like can be used. In an example, MSE can be used to calculate mean squared error between an original image and a reconstructed image of the original image, and the reconstructed image is an operation result under a coding tool or under a configuration of the coding tool. PSNR can be calculated as the ratio between the maximum possible power of a signal and the power of corrupting noise that affects the fidelity of its representation. PSNR can be defined based on MSE. MSE or PSNR are calculated based on absolute errors.

In another example, SSIM can be used for measuring similarity of an original image and a reconstructed image of the original image. SSIM uses structural information that the pixels have strong inter-dependencies especially when they are spatially close. The dependencies carry important information about the structure of the objects in the visual scene. MS-SSIM can be conducted over multiple scales through a process of multiple stages of subsampling.

In some examples for evaluation video/image coding qualities for machine vision, performance metrics, such as mean average precision (mAP), multiple object tracking accuracy (MOTA), and the like can be used to measure the performance of machine vision tasks such as object detection, segmentation or tracking, and the like. Further, bits per pixel (BPP) can be used to measure the cost for storage or transmission of a generated bitstream for VCM.

Specifically, in some examples, mAP is computed as the area under a precision-recall curve (PR curve) where x-axis is recall and y-axis is precision. In some examples, BPP is calculated with respect to an image resolution, for example, the original image resolution.

In some examples, picture quality vs. coding efficiency characteristic can be determined for a coding tool for VCM, and performance evaluation of the coding tool can be determined based on picture quality vs. coding efficiency characteristic. Picture quality vs. coding efficiency characteristic for a coding tool represents a relationship of picture quality with coding efficiency by using the coding tool for coding a video. In some examples, the picture quality vs. coding efficiency characteristic of a coding tool can be represented as a curve in a two dimensional plane with picture quality on a first axis and coding efficiency on a second axis. In some examples, the picture quality vs. coding efficiency characteristic of a coding tool can be represented by an equation that calculates coding efficiency based on picture quality. In some examples, the picture quality vs. coding efficiency characteristic of a coding tool can be represented using a lookup table that associates picture quality with coding efficiency.

In an example, picture quality is measured based on mAP (or MOTA), and the coding efficiency is measured based on BPP. A relationship between mAP (or MOTA) vs. BPP can be drawn as a curve indicative of picture quality vs. coding efficiency characteristic and can be used to represent the performance of a coding scheme (also referred to as a coding tool) for machine vision. In addition, video/images can be pre-processed before video/image coding and cropping through padding or scaling to achieve different resolutions of the original contents, such a 100%, 75%, 50% and 25% of original resolution. The decoded video/images can be scaled back to original resolution after decoding for machine vision tasks. In some embodiments, several mAP (or MOTA) vs. BPP curves can be drawn for a coding scheme for machine vision.

Some aspects of the disclosure provide techniques to calculate a single performance value (performance metric), for example from a relationship curve or multiple relationship curves between mAP (or MOTA) and BPP, thus comparison of multiple coding schemes for machine vision can be based on the performance values of the multiple coding schemes. For example, the controller (150) can calculate performance metric values respectively for the multiple coding schemes, and can select a coding scheme from the multiple coding schemes based on the performance metric values.

It is noted that, in the following description, relationship curves of mAP vs. BPP are used to illustrate the performance metric techniques according to some aspects of the disclosure. The performance metric techniques can be used on other relationship curves. For example, mAP can be changed to other suitable measures for performance, such as MOTA, average precision at intersection over union threshold of 50% (AP50), average precision at intersection over union threshold of 75%, mean accuracy and the like. In another example, BPP can be changed to bitrate when the input is a video.

According to some aspects of the disclosure, Bjøntegaard delta (BD) metric, such as BD mean average precision (BD-mAP), BD bits per pixel (BD-rate) can be used in performance evaluation for video coding for machines.

Figure 2:
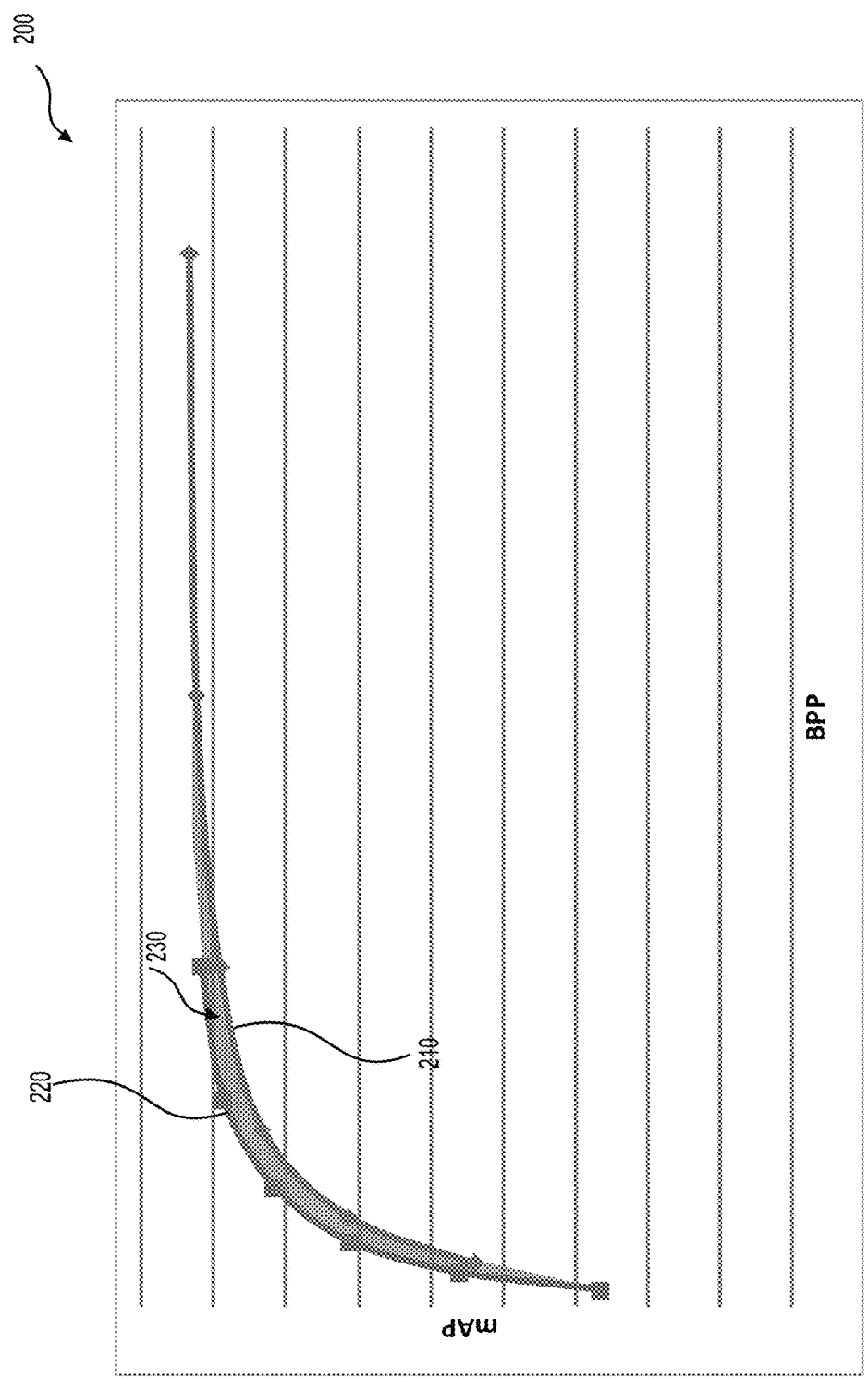
FIG. 2 shows a plot to illustrate a calculation of a Bjøntegaard delta (BD) metric for video coding for machines according to some embodiments of the disclosure.

FIG. 2 shows a plot (200) to illustrate a calculation of a BD metric for video coding for machines according to some embodiments of the disclosure. The plot (200) includes a first curve (210) of mAP vs. BPP for a first VCM scheme and a second curve (220) of mAP vs. BPP for a second VCM scheme. In some examples, mAP and BPP values can be determined in accordance with different values of a quantization parameter (QP), such as a QP for all I slices (QPISlice).

For example, to coding a video using the first VCM scheme, the controller (150) sets a QPISlice value, and the video encoder (130) and the feature encoder (140) can encode a video using the first VCM scheme based on the QPISlice value, and generate a first coded bitstream. Based on the first coded bitstream, mAP and BPP values associated with the QPISlice value can be determined, for example by the controller (150). The controller (150) can set different QPISlice values for using the first VCM scheme, and determine mAP and BPP values associated with respective QPISlice values. Then, the mAP and BPP values are used to form the first curve (210). For example, for a QPISlice value, the mAP value and the BPP value associated with the QPISlice value are used to form a point on the first curve (210).

Similarly, to coding a video using the second VCM scheme, the controller (150) sets a QPISlice value, and the video encoder (130) and the feature encoder (140) can encode a video using the second VCM scheme based on the QPISlice value, and generate a second coded bitstream. Based on the second coded bitstream, mAP and BPP values associated with the QPISlice value can be determined, for example by the controller (150). The controller (150) can set different QPISlice values for using the second VCM scheme, and determine mAP and BPP values associated with respective QPISlice values. Then, the mAP and BPP values are used to form the second curve (220). For example, for a QPISlice value, the mAP value and the BPP value associated with the QPISlice value are used to form a point on the second curve (220).

According to an aspect of the disclosure, BD-mAP can be determined as an average gap between the first curve (210) and the second curve (220), and the average gap can be calculated in terms of an area (230) (shown by gray shade) between the first curve (210) and the second curve (220). In some examples, the controller (150) can execute software instructions corresponding to an algorithm for calculating an area of a gap between two curves, such as the first curve (210) and the second curve (220), and determine BD-mAP value based on the area for example.

In some examples, the first VCM scheme can be a reference scheme (also referred to as an anchor), and the second VCM scheme is a scheme under evaluation (or under test). In an example, the reference scheme is applied on a video that is not scaled (or the scale is 100%), and the scheme under evaluation can be applied on a 75% scaled video of the video. The BD metric of the second VCM scheme with reference to the reference scheme can be used to compare performance of the second VCM scheme with other VCM scheme (other than the first VCM scheme and the second VCM scheme).

In some embodiments, BD-rate can be similarly determined.

Figure 3:
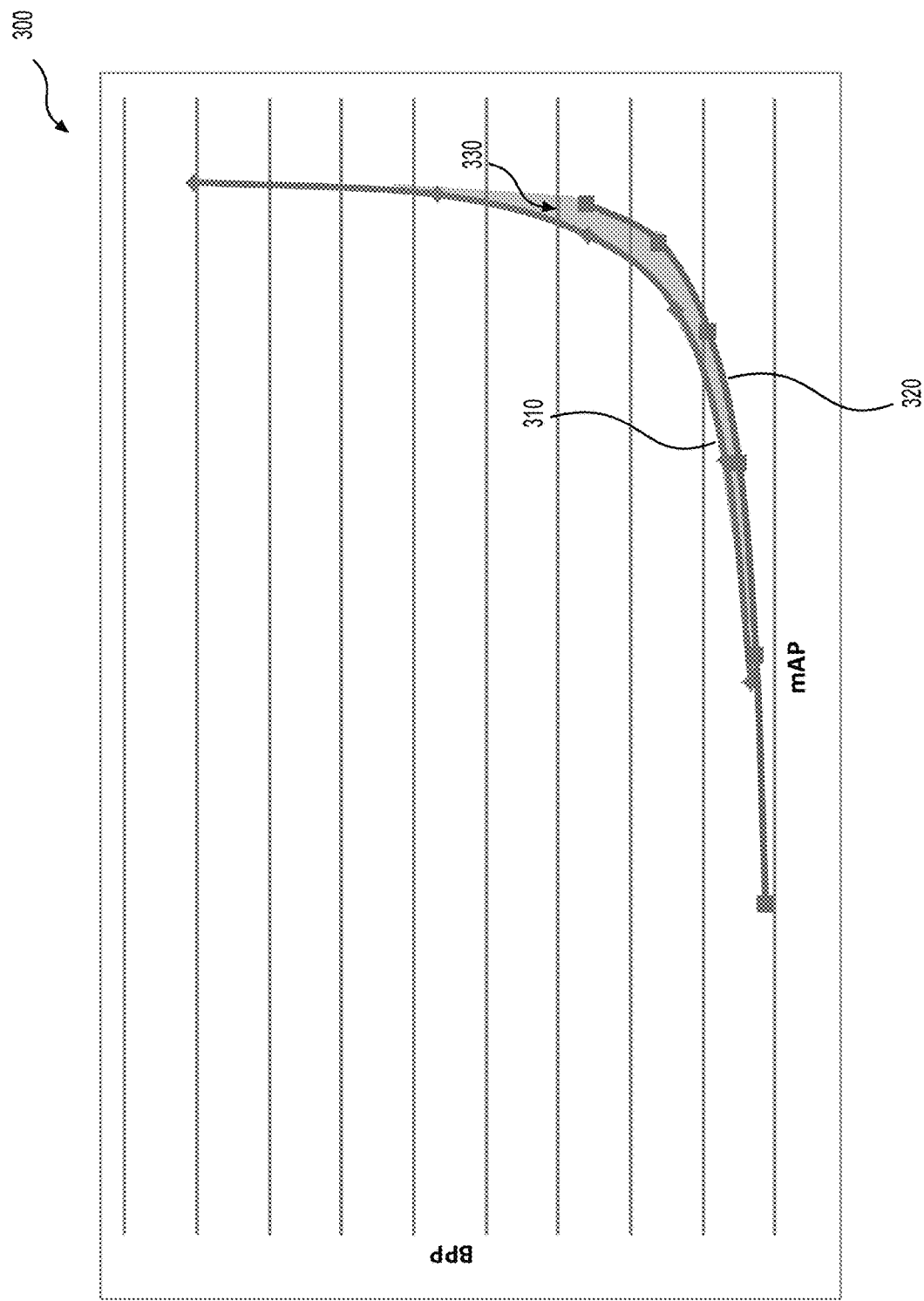
FIG. 3 shows another plot to illustrate a calculation of a Bjøntegaard delta (BD) metric for video coding for machines according to some embodiments of the disclosure.

FIG. 3 shows a plot (300) to illustrate a calculation of a BD metric for video coding for machines according to some embodiments of the disclosure. The plot (300) includes a first curve (310) of BPP vs. mAP for a first VCM scheme and a second curve (320) of BPP vs. mAP for a second VCM scheme. In some examples, mAP and BPP values can be determined in accordance with different values of QPISlice in the same manner as described with reference to FIG. 2.

According to an aspect of the disclosure, BD-rate can be determined as an average gap between the first curve (310) and the second curve (320), and the average gap can be calculated in terms of an area (330) between the first curve (310) and the second curve (320). In some examples, the controller (150) can execute software instructions corresponding to an algorithm for calculating an area of a gap between two curves, such as the first curve (310) and the second curve (320), and determine BD-rate value based on the area for example.

In some examples, the first VCM scheme can be a reference scheme, and the second VCM scheme is a scheme under evaluation. In an example, the reference scheme is applied on a video that is not scaled (or the scale is 100%), and the scheme under evaluation can be applied on a 75% scaled video of the video. In an example, the average gap between the first curve (310) and the second curve (320) indicates 14.75% less bits to transmit or store using the second VCM scheme when equivalent quality is achieved. The BD metric of the second VCM scheme with reference to the reference scheme can be used to compare performance of the second VCM scheme with other VCM scheme (other than the first VCM scheme and the second VCM scheme). For example, when BD-rate of a third VCM scheme indicates 10% less bits to transmit or store, then the second VCM scheme is determined to have better VCM performance than the third VCM scheme.

According to an aspect of the disclosure, when comparing two VCM schemes, multiple BPP vs. mAP (or mAP vs. BPP) curves can be generated for each scheme, and some techniques are used to determine a single performance metric, such as a BD metric, indicative of an overall summary of the performance difference value for performance comparison.

In an embodiment, a first pareto front curve can be formed based on the multiple BPP vs. mAP ((or mAP vs. BPP) curves for the first VCM scheme, and a second pareto front curve can be formed based on the multiple mAP vs BPP curves for the second VCM scheme. For example, for the first VCM scheme, when a specific BPP vs. mAP curve is always better than other BPP vs. mAP curves, the specific BPP vs. mAP curve can be used as the first pareto front curve. However, when the multiple BPP vs. mAP curves may intersect, the optimal sections of the multiple BPP vs. mAP curves can be selected to form the first pareto front curve. The second pareto front curve can be similarly formed for the second VCM scheme. Then, BD metric can be calculated using the first pareto front curve of the first scheme and the second pareto front curve of the second scheme.

In another embodiment, BD metric can be calculated respectively for the multiple BPP vs. mAP curves of a VCM scheme, and an average (e.g., weighted average) of the values of the BD metric can be used for performance comparison.

In some examples, a video can be pre-processed to achieve different resolutions of the original contents, and then the pre-processed videos can be respectively coded using a first VCM scheme and a second VCM scheme, and BD-rates can be calculated respectively for the different resolutions. In an example, a video is pre-processed to achieve four videos of different resolution, such as a first video of 100% resolution, a second video of 75% resolution, a third video of 50% resolution and a fourth video of 25% resolution. In an example, the first VCM scheme and the second VCM scheme can be applied on the first video to calculate a first BD-rate; the first VCM scheme and the second VCM scheme can be applied on the second video to calculate a second BD-rate; the first VCM scheme and the second VCM scheme can be applied on the third video to calculate a third BD-rate; the first VCM scheme and the second VCM scheme can be applied on the fourth video to calculate a fourth BD-rate. Then, an average of the first BD-rate, the second BD-rate, the third BD-rate and the fourth BD-rate can be calculated as an overall BD-rate for performance comparison of the first VCM scheme and the second VCM scheme.

In some examples, the BD-rates can be weighted equally or differently to calculate the overall BD-rate. In an example, a particular scale has more importance than other scales, and higher weight may be assigned to the particular scale. In some examples, the sum of all weights is equal to 1. It is noted that BPP vs. mAP curves for various resolution scales are used as an example to illustrate comparison of two VCM schemes that each with multiple curves. The techniques to handle multiple curves are not limited to ones with various resolution scales.

According to some aspects of the disclosure, in certain application, a decoded video can be consumed by both machine vision and human vision, a performance metric can be used to compare two coding schemes considering both use cases (consumption by both machine vision and human vision) at once. In an embodiment, a first BD-rate for machine vision and a second BD-rate for human vision can be respectively calculated and then suitably combined to form a performance metric for performance comparison of two coding schemes.

In some examples, when comparing two coding schemes, a first BD-rate for machine vision, denoted as $BD_m$, can be calculated using machine vision metric, such as BPP vs. mAP curves. Then, a second BD-rate for human vision, denoted as $BD_h$, can be calculated using human vision metric, such as bitrate curve vs. PSNR, bitrate curve vs. MS-SSIM, bitrate curve vs. SSIM, and the like. It is noted that, similar human vision related performance metric other than PSNR, MS-SSIM or SSIM can be used to measure coding performance for human vision.

In some examples, the first BD-rate for machine vision and the second BD-rate for human vision can be combined to calculate a final performance comparison result that is denoted by $BD_{overall}$. For example, Eq. (1) can be used to combine the first BD-rate $BD_m$ for machine vision and the second BD-rate $BD_h$ for human vision:

$$BD_{overall}=(1-w) \times BD_m + w \times BD_h \qquad \text{Eq. (1)}$$

where w denotes a weight in a range of [0,1] and is indicative of a relative importance of human vision to an overall coding performance.

In some embodiments, a cost metric can be calculated as a performance metric for comparison of coding schemes. The cost metric (denoted as C) can include a first portion for distortion and a second portion for rate information (denoted as RT). The distortion can be an overall distortion (denoted as D) that is generated as a combination of distortion for human vision (denoted as $D_h$) and distortion for machine vision (denoted as $D_m$). In an example, the rate information (denoted as RT) can be bitstream length used to represent the coded video. In an example, the overall distortion D and the cost metric C can be calculated using Eq. (2) and Eq. (3):

$$D=(1-w1) \times D_m + w1 \times D_h \qquad \text{Eq. (2)}$$

$$C=D+\lambda \times RT \qquad \text{Eq. (3)}$$

where w1 is a weight in a range of [0,1], and is used to indicate a relative importance of human vision in the overall application of a combination of human vision and machine vision. The parameter λ is a non-negative scalar used to indicate the relative importance of distortion and rate.

In some examples, the distortion for human vision $D_h$ can be calculated as a normalized mean error (NME), such as using Eq. (4):

$$NME = \frac{1}{N(\|P\|_{max})^p} \sum_{i=0}^{N-1} \|P'(i) - P(i)\|^p \qquad \text{Eq. (4)}$$

where N denotes a total number of pixels in an image or video; p is often 1 or 2; $\|P\|$ denotes the corresponding p-normal operation; $\|P\|_{max}$ denotes the maximum p-normal for pixels in the original image or video; P(i) denotes the i-th pixel in the original image or video; while P'(i) represented the i-th pixel in the decoded image or video. It is noted that NME is in a range of [0,1].

In some examples, the p-normal operation $\|P\|$ may be changed into the absolute value operation, for example, when the image or video is monochrome with only a single color channel. In an example, when color images or video are used, a pixel can be represented by a three-value tuple, such as (R, G, B), where R, G, and B denote to the three color channel values in RGB color space. In another example, when color images or video are used, a pixel can be represented by a three-value tuple, such as (Y, Cb, Cr), where Y, Cb, and Cr denote to the three channel values in the YCbCr color space. Using the example of RGB color space, the p-normal operation can be calculated for example, using Eq. (5):

$$\|P\| = \sqrt[p]{w_R \times R^p + w_G \times G^p + w_B \times B^p} \qquad \text{Eq. (5)}$$

where $w_R$, $w_G$, $w_B$ denotes weights for each color channel, which may or may not be the same. In some examples, if three channels have different resolutions, then smaller weights may be applied to channels with lower resolutions to reflect such difference.

In some examples, normalized mean error (NME) for each channel can be computed first, such as using Eq. (6)-Eq. (8):

$$NME_R = \frac{1}{N_R(\|R\|_{max})^p} \sum_{i=0}^{N_R-1} \|R'(i) - R(i)\|^p \qquad \text{Eq. (6)}$$

$$NME_G = \frac{1}{N_G(\|G\|_{max})^p} \sum_{i=0}^{N_G-1} \|G'(i) - G(i)\|^p \qquad \text{Eq. (7)}$$

$$NME_B = \frac{1}{N_B(\|B\|_{max})^p} \sum_{i=0}^{N_B-1} \|B'(i) - B(i)\|^p \qquad \text{Eq. (8)}$$

where $N_R$, $N_G$, and $N_B$ denote the numbers of pixels in the R, G, B channels respectively; $R_{max}$, $G_{max}$, and $B_{max}$ denote the maximum values in the R, G and B channels and often are set to be the same value in some examples. (R(i), G(i), B(i)) denotes the i-th pixel in the original image or video and (R'(i), G'(i), B'(i)) denotes the i-th pixel in the decoded image or video. In addition, in an example, p is often set to 1 or 2. The overall normalized mean error NME can be computed as weighted average of $NME_R$, $NME_G$, $NME_R$, such as using Eq. (9):

$$NME = w_R \times NME_R + w_G \times NME_G + w_B \times NME_R \qquad \text{Eq. (9)}$$

where $w_R$, $w_G$, $w_B$ are non-negative weights representing the relative importance of the three color channels and $w_R + w_G + w_B = 1$.

It is noted that the above channel-based NME calculation in (6)-(8) may be suitable changed to other color formats, such as Y'CbCr (YUV) with 4:2:0 subsampling or 4:4:4 subsampling. In an example, weight 1 can be assigned to Y component only, while weight 0 is assigned to the other two components Cb and Cr. In another example, weights are decided based on sample resolutions of each channel. For example, in 4:2:0, weights in UV components should be smaller than the weight in Y component as Y has higher resolution than UV.

According to an aspect of the disclosure, the distortion for machine vision can be represented as (1−mAP) or (1−MOTA) depending on machine tasks. It is noted that mAP and MOTA are in a range of [0, 1]. It is also noted that other similar performance metric for machine vision, such as mean accuracy, can also be used to replace mAP or MOTA in the computation of distortion of machine vision.

In some examples, when distortion for human vision is greater than a threshold (denoted as $Thresh_h$) for human vision, the decoded image may not be useful for a purpose of a combination of human vision and machine vision. Similarly, when the distortion for machine vision is greater than a threshold (denoted as $Thresh_m$) for machine vision, the decoded image becomes useless for a purpose of a combination of human vision and machine vision. In either case, the overall distortion D is set to a predefined value, such as its maximum value (e.g., 1).

FIG. 4 shows an example of pseudo codes (400) for calculating the overall distortion D and the overall cost metric C in an example when both machine vision and human vision are considered. In the FIG. 4 example, w1 is a weight in a range of [0,1], and is used to indicate a relative importance of human vision in the overall application of a combination of human vision and machine vision. The parameter $D_h$ is the distortion for human vision and the parameter $D_m$ is the distortion for machine vision. The parameter λ is a non-negative scalar used to indicate the relative importance of distortion and rate. The parameter $Thresh_h$ is a distortion threshold for human vision, the parameter $Thresh_m$ is a distortion threshold for machine vision.

In some examples, the distortion of machine vision tasks may be considered more important than human vision tasks while the quality of human vision perspective should be maintained at a lowest acceptable level.

FIG. 5 shows an example of pseudo codes (500) for calculating the overall distortion D and the overall cost metric C in an example that the distortion of machine vision tasks is considered more important than human vision tasks. The quality of human vision perspective can be maintained at a lowest acceptable level. In the FIG. 5 example, w1 is a weight in a range of [0,1], and is used to indicate a relative importance of human vision in the overall application of a combination of human vision and machine vision. The parameter $D_m$ is the distortion for machine vision. The parameter λ is a non-negative scalar used to indicate the relative importance of distortion and rate. The parameter $Thresh_h$ is a distortion threshold for human vision.

In some examples, the distortion of human vision may be taken into account when the distortion of human vision falls below a lowest acceptable level.

Figure 6:

FIG. 6 shows an example of pseudo codes (600) for calculating the overall distortion D and the overall cost metric C in an example that the distortion of machine vision tasks is considered more important than human vision tasks. The distortion of human vision may be taken into account when the distortion of human vision falls below a lowest acceptable level. In the FIG. 6 example, w1 is a weight in a range of [0,1], and is used to indicate a relative importance of human vision in the overall application of a combination of human vision and machine vision. The parameter $D_h$ is the distortion for human vision and the parameter $D_m$ is the distortion for machine vision. The parameter λ is a non-negative scalar used to indicate the relative importance of distortion and rate. The parameter $Thresh_h$ is a distortion threshold for human vision.

In some examples, in addition to combining coding performance for human vision and machine vision, coding performance for multiple tasks, such as more than two tasks can be combined. The multiple tasks can include object detection task, object segmentation task, object tracking task and the like. In an example of M tasks (M is an integer greater than two), the overall BD-rate can be a weighted combination of BD-rates for individual tasks, such as using Eq. (10):

$$BD_{overall} = w(0) \times BD_0 + w(1) \times BD_1 + \ldots + w(M-1) \times BD_{M-1} \qquad \text{Eq. (10)}$$

where w(i), i=0, 1, . . . , M−1 are non-negative weight factors and w(0)+w(1)+ . . . +w(M−1)=1. $BD_i$, i=0, . . . , M−1 are the respective BD-rates for the M tasks.

In an example of M tasks (M is an integer greater than two), the overall distortion can be a weighted combination of distortions for individual tasks, such as using Eq. (11), and then the cost metric C can be calculated, for example, using Eq. (12):

$$D = w(0) \times D_0 + w(1) \times D_1 + \ldots + w(M-1) \times D_{M-1} \qquad \text{Eq. (11)}$$

$$C = D + \lambda \times RT \qquad \text{Eq. (12)}$$

where w(i), i=0, 1, ..., M−1 are non-negative weight factors and w(0)+w(1)+ . . . +w(M−1)=1. $D_i$, i=0, . . . , M−1 are the respective distortion for the M tasks.

In some examples, when distortion for a task is greater than a threshold for the task, the decoded image may not be useful for a purpose of a combination of the multiple tasks.

Figure 7:

FIG. 7 shows an example of pseudo codes (700) for calculating the overall distortion D and the overall cost metric C in an example when thresholds are used respectively for each task. When distortion for a task is greater than a threshold for the task, the decoded image may not be useful for a purpose of a combination of the multiple tasks. In the FIG. 7 example, w(i), i=0, 1, . . . , M−1 are non-negative weight factors and w(0)+w(1)+ . . . +w(M−1)=1. $D_i$, i=0, . . . , M−1 are the respective distortions for the M tasks. $Thresh_i$, i=0, . . . , M−1 are the respective thresholds for the M tasks.

In some examples, based on the computed overall distortion, the overall weighted precision, denoted as wmAP, can be calculated, for example, using Eq. (13):

$$wmAP = 1 - D \qquad \text{Eq. (13)}$$

Further, wmAP vs. BPP curve can be formed. Then, a corresponding BD-rate for a comparison of two wmAP vs. BPP curves can be computed.

In an embodiment to compare two coding schemes, such as an anchor coding scheme and a test coding scheme, the overall BD-rate can be computed. If the overall BD-rate is negative, the test coding scheme has better performance than the anchor coding scheme.

In an embodiment to compare two coding scheme, such as an anchor coding scheme and a test coding scheme, the respective cost metric values can be computed. The coding scheme with a smaller total cost metric value is considered to have the better performance.

It is noted that the techniques described above can be suitably modified. In some examples, transform functions can be used. In an example, machine vision quality metrics, such as mAP or MOTA, may be used as the input of a transform function. The output of the transform function can then be used in the BD-rate calculation. The transform function can include linear scaling, square root operation, logarithm domain transformation, and the like.

Figure 8:
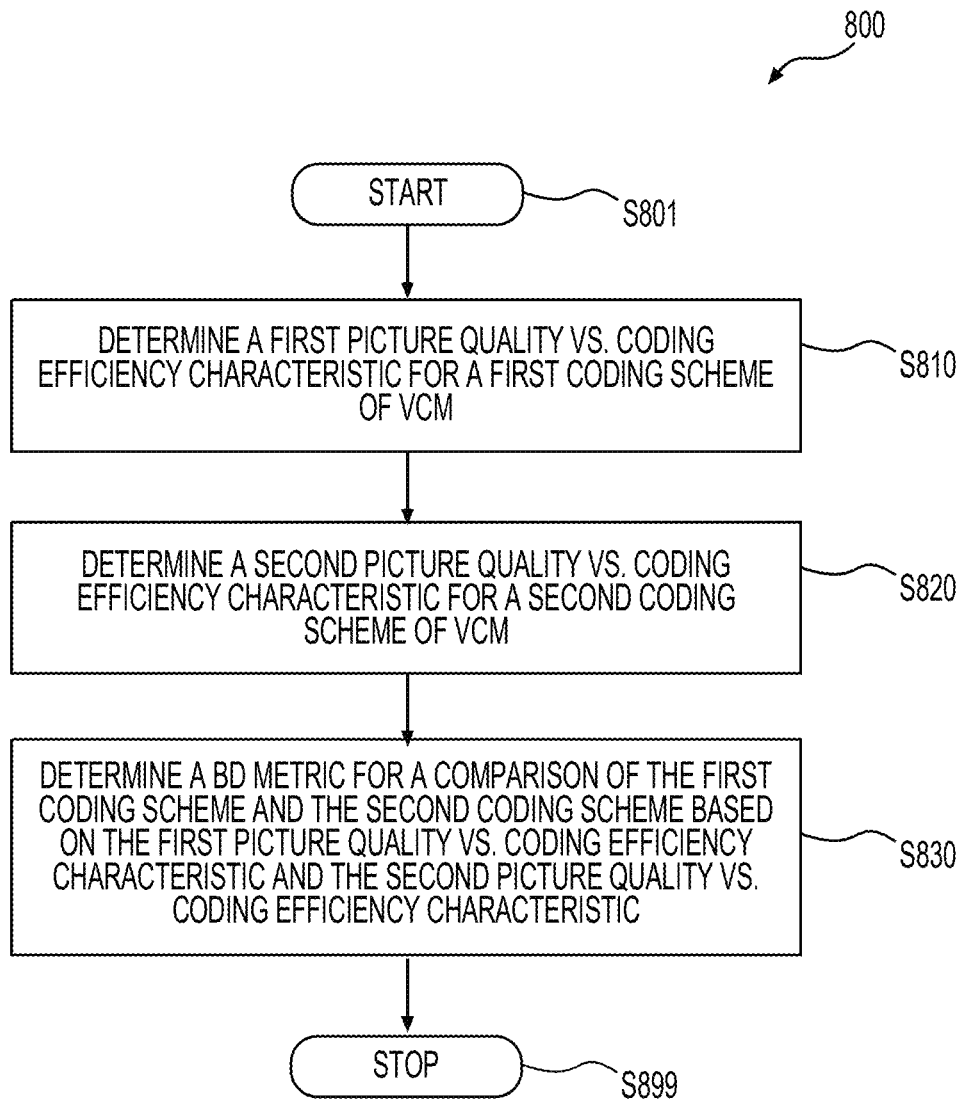
FIG. 8 shows a flow chart outlining a process example according to an embodiment of the disclosure.

FIG. 8 shows a flow chart outlining a process (800) according to an embodiment of the disclosure. The process (800) can be used for coding scheme comparison, such as used in the VCM system (100), and the like. In various embodiments, the process (800) is executed by processing circuitry, such as the processing circuit (120), and the like. In some embodiments, the process (800) is implemented in software instructions, thus when the processing circuitry executes the software instructions, the processing circuitry performs the process (800). The process starts at (S801) and proceeds to (S810).

At (S810), a first picture quality vs. coding efficiency characteristic for a first coding scheme of VCM is determined.

At (S820), a second picture quality vs. coding efficiency characteristic for a second coding scheme of VCM is determined.

In some examples, the picture quality can be measured by any suitable machine vision quality metrics, such as mean average precision (mAP), multiple object tracking accuracy (MOTA), average precision at intersection over union threshold of 50% (AP50), average precision at intersection over union threshold of 75% (AP75), mean accuracy and the like. The coding efficiency can be measured by any suitable metric for VCM, such as bits per pixel (BPP), and the like.

At (S830), a Bjøntegaard delta (BD) metric for a comparison of the first coding scheme and the second coding scheme can be determined based on the first picture quality vs. coding efficiency characteristic and the second picture quality vs. coding efficiency characteristic.

In some examples, the first picture quality vs. coding efficiency characteristic includes a first curve in a two dimensional plane for picture quality and coding efficiency, and the second picture quality vs. coding efficiency characteristic includes a second curve in the two dimensional plane for the picture quality and coding efficiency. Then, the BD metric can be calculated as an average gap between the first curve and the second curve. The average gap can be calculated in the term of an area between the first curve and the second curve.

In an example, the BD metric is calculated in term of mean average precision (mAP), such as denoted by BD-mAP. In another example, the BD metric is calculated in term of bits per pixel (BPP), such as denoted by BD-BPP or BD-rate. In an example, the BD metric is calculated in term of multiple object tracking accuracy (MOTA), such as denoted by BD-MOTA. In an example, the BD metric is calculated in term of average precision at intersection over union threshold of 50% (AP50), such as denoted by BD-AP50. In an example, the BD metric is calculated in term of average precision at intersection over union threshold of 75% (AP75), such as denoted by BD-AP75. In an example, the BD metric is calculated in term of mean accuracy.

In some examples, first picture quality vs. coding efficiency characteristic includes first multiple picture quality vs. coding efficiency curves for the first coding scheme in a two dimensional plane for picture quality and coding efficiency, and the second picture quality vs. coding efficiency characteristic includes second multiple picture quality vs. coding efficiency curves for the second coding scheme in the two dimensional plane for the picture quality and coding efficiency. In an example, a first pareto front curve is computed based on the first multiple picture quality vs. coding efficiency curves for the first coding scheme is computed, and a second pareto front curve is computed based on the second multiple picture quality vs. coding efficiency curves for the second coding scheme. Then, the BD metric is computed based on the first pareto front curve and the second pareto front curve.

In another example, the second picture quality vs. coding efficiency characteristic curves respectively correspond to the first picture quality vs. coding efficiency characteristic curves. Then, BD metric values are calculated respectively based on the first picture quality vs. coding efficiency characteristic curves and the corresponding second picture quality vs. coding efficiency characteristic curves. Then, a weighted sum of the BD metric values can be calculated as an overall BD metric for the comparison of the first coding scheme and the second coding scheme.

In some examples, the first coding scheme and the second coding scheme are used for video coding for both machine vision and human vision. In an example, a first BD-rate of bits per pixel (BPP) for machine vision is calculated and a second BD-rate for human vision is calculated. Then, a weighted sum of the first BD-rate and the second BD-rate is calculated as an overall BD metric for the comparison of the first coding scheme and the second coding scheme In another example, a first overall distortion is calculated based on a weighted sum of distortions for the machine vision and the human vision by the first coding scheme. Then, a first cost metric value is calculated based on the first overall distortion and first rate information of the first coding scheme. Further, a second overall distortion is calculated based on a weighted sum of distortions of the machine vision and the human vision by the second coding scheme, and a second cost metric value is calculated based on the second overall distortion and second rate information of the second coding scheme. The first coding scheme and the second coding scheme can be compared based on the first cost metric value and the second cost metric value.

In another example, the first picture quality is determined based on a weighted sum of distortions for the machine vision and the human vision by the first coding scheme. The second picture quality is determined based on a weighted sum of distortions for the machine vision and the human vision by the second coding scheme. Then, the BD metric can be calculated and used for comparison of the first coding scheme and the second coding scheme.

In some examples, the first coding scheme and the second coding scheme are used for video coding for multiple vision tasks. Then, the first picture quality can be determined based on a weighted sum of distortions for the multiple vision tasks by the first coding scheme. The second picture quality can be determined based on a weighted sum of distortions for the multiple vision tasks by the second coding scheme. Then, the BD metric can be calculated and used for comparison of the first coding scheme and the second coding scheme.

Then, the process proceeds to (S899) and terminates.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
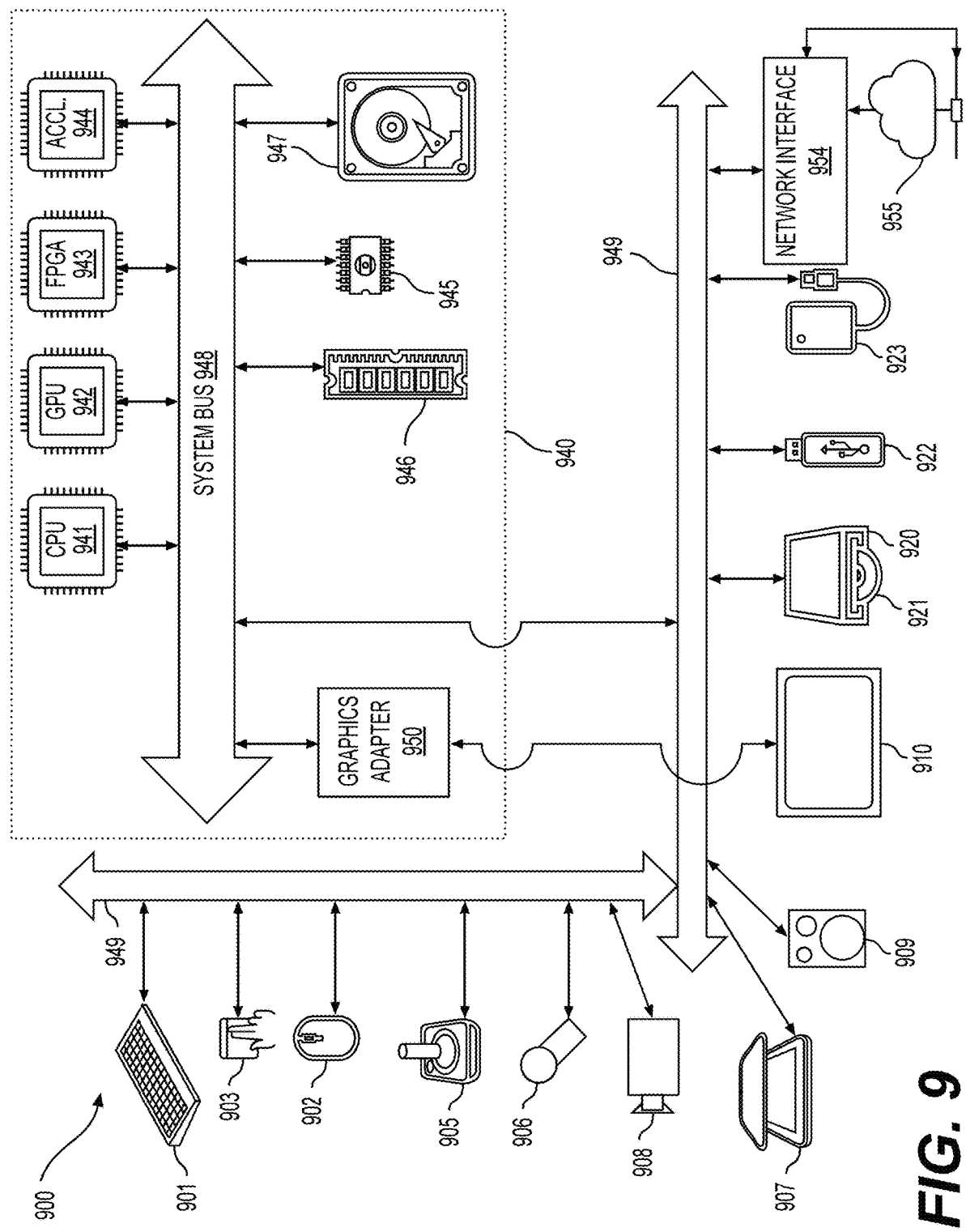
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding, comprising:
   determining, by a processing circuit, a first picture quality vs. coding efficiency characteristic for a first coding scheme of video coding for machines (VCM), wherein the first picture quality vs. coding efficiency characteristic includes plural first picture quality vs. coding efficiency curves for the first coding scheme;
   determining, by the processing circuit, a second picture quality vs. coding efficiency characteristic for a second coding scheme of VCM, wherein the second picture quality vs. coding efficiency characteristic includes plural second picture quality vs. coding efficiency curves for the first coding scheme;
   computing a first Pareto front curve of the plural first picture quality vs. coding efficiency curves for the first coding scheme;
   computing a second Pareto front curve of the plural second picture quality vs. coding efficiency curves for the second coding scheme;
   determining, by the processing circuit, a Bjøntegaard delta (BD) metric for a comparison of the first coding scheme and the second coding scheme, based on the computed first Pareto front curve for the first coding scheme and the computed second Pareto front curve for the second coding scheme; and
   selecting, for use in a video encoder, one of the first coding scheme of VCM or the second coding scheme of VCM based on the BD metric indicating the comparison of the first coding scheme and the second coding scheme.

2. The method of claim 1, further comprising:
   calculating the BD metric in at least one of mean average precision (mAP), bits per pixel (BPP), multiple object tracking accuracy (MOTA), average precision at intersection over union threshold of 50% (AP50), average precision at intersection over union threshold of 75% (AP75), or mean accuracy.

3. The method of claim 1, wherein the plural first picture quality vs. coding efficiency curves are in a two dimensional plane for picture quality and coding efficiency, and the plural second picture quality vs. coding efficiency curves are in the two dimensional plane for the picture quality and coding efficiency.

4. The method of claim 3, further comprising:
   calculating the BD metric as an average gap between the first Pareto front curve and the second Pareto front curve.

5. The method of claim 1, wherein the first coding scheme and the second coding scheme are used for video coding for both machine vision and human vision, and the method comprises:
- calculating a first BD-rate of bits per pixel (BPP) for machine vision;
- calculating a second BD-rate for human vision; and
- calculating a weighted sum of the first BD-rate and the second BD-rate as an overall BD metric for the comparison of the first coding scheme and the second coding scheme.

6. The method of claim 1, wherein the first coding scheme and the second coding scheme are used for video coding for both machine vision and human vision, and the method comprises:
- determining the first picture quality based on a weighted sum of distortions for the machine vision and the human vision by the first coding scheme; and
- determining the second picture quality based on a weighted sum of distortions for the machine vision and the human vision by the second coding scheme.

7. The method of claim 1, wherein the first coding scheme and the second coding scheme are used for video coding for multiple vision tasks, and the method comprises:
- determining the first picture quality based on a weighted sum of distortions for the multiple vision tasks by the first coding scheme; and
- determining the second picture quality based on a weighted sum of distortions for the multiple vision tasks by the second coding scheme.

8. An apparatus for video coding comprising:
processing circuitry configured to:
- determine a first picture quality vs. coding efficiency characteristic for a first coding scheme of video coding for machines (VCM), wherein the first picture quality vs. coding efficiency characteristic includes plural first picture quality vs. coding efficiency curves for the first coding scheme;
- determine a second picture quality vs. coding efficiency characteristic for a second coding scheme of VCM, wherein the second picture quality vs. coding efficiency characteristic includes plural second picture quality vs. coding efficiency curves for the first coding scheme;
- compute a first Pareto front curve of the plural first picture quality vs. coding efficiency curves for the first coding scheme;
- compute a second Pareto front curve of the plural second picture quality vs. coding efficiency curves for the second coding scheme;
- determine a Bjøntegaard delta (BD) metric for a comparison of the first coding scheme and the second coding scheme, based on the computed first Pareto front curve for the first coding scheme and the computed second Pareto front curve for the second coding scheme; and
- select, for use in a video encoder, one of the first coding scheme of VCM or the second coding scheme of VCM based on the BD metric indicating the comparison of the first coding scheme and the second coding scheme.

9. The apparatus of claim 8, wherein the processing circuitry is configured to:
- calculate the BD metric in at least one of mean average precision (mAP), bits per pixel (BPP), multiple object tracking accuracy (MOTA), average precision at intersection over union threshold of 50% (AP50), average precision at intersection over union threshold of 75% (AP75), or mean accuracy.

10. The apparatus of claim 8, wherein the plural first picture quality vs. coding efficiency curves are in a two dimensional plane for picture quality and coding efficiency, and the plural second picture quality vs. coding efficiency curves are in the two dimensional plane for the picture quality and coding efficiency.

11. The apparatus of claim 10, wherein the processing circuitry is configured to:
- calculate the BD metric as an average gap between the first Pareto front curve and the second Pareto front curve.

12. The apparatus of claim 8, wherein the first coding scheme and the second coding scheme are used for video coding for both machine vision and human vision, and the processing circuitry is configured to:
- calculate a first BD-rate of bits per pixel (BPP) for machine vision;
- calculate a second BD-rate for human vision; and
- calculate a weighted sum of the first BD-rate and the second BD-rate as an overall BD metric for the comparison of the first coding scheme and the second coding scheme.

13. The apparatus of claim 8, wherein the first coding scheme and the second coding scheme are used for video coding for both machine vision and human vision, and the processing circuitry is configured to:
- determine the first picture quality based on a weighted sum of distortions for the machine vision and the human vision by the first coding scheme; and
- determine the second picture quality based on a weighted sum of distortions for the machine vision and the human vision by the second coding scheme.

14. The apparatus of claim 8, wherein the first coding scheme and the second coding scheme are used for video coding for multiple vision tasks, and the processing circuitry is configured to:
- determine the first picture quality based on a weighted sum of distortions for the multiple vision tasks by the first coding scheme; and
- determine the second picture quality based on a weighted sum of distortions for the multiple vision tasks by the second coding scheme.

* * * * *